(12) United States Patent
Wu

(10) Patent No.: US 6,394,617 B1
(45) Date of Patent: May 28, 2002

(54) METHOD AND APPARATUS FOR LATCHED BIMORPH OPTICAL SWITCHS

(75) Inventor: Shudong Wu, Fremont, CA (US)

(73) Assignee: Avanex Corporation, Fremont, CA (US)

(*) Notice: Subject to any disclaimer, the term of this patent is extended or adjusted under 35 U.S.C. 154(b) by 0 days.

(21) Appl. No.: 09/752,177

(22) Filed: Dec. 29, 2000

(51) Int. Cl.⁷ .............................................. G02B 7/182
(52) U.S. Cl. ........................ 359/877; 359/878; 359/138; 359/139
(58) Field of Search ................................ 359/877, 878, 359/223, 224, 225, 226, 115, 138, 139, 871, 872

(56) References Cited

U.S. PATENT DOCUMENTS 6,253,001 B1 * 6/2001 Hoen ........................... 385/17
6,283,601 B1 * 9/2001 Hagelin et al. ............... 359/871
6,300,665 B1 * 10/2001 Peeters et al. ................ 257/415

* cited by examiner

Primary Examiner—Mohammad Sikder
(74) Attorney, Agent, or Firm—Fernandez & Associates, LLP

(57) ABSTRACT

The present invention provides a method and apparatus for compact, high-speed, latched optical switching devices utilizing bimorph piezoelectric material. The apparatus employs an optical switching prism, that is capable of interchanging two parallel beams, to construct a 2×2 optical switch. In order to construct compact and high-speed switches, the prism has to be small and light-weigh, thus, the separation of the two parallel beams becomes small. A pair of reflection corner mirror capable of separating these two close parallel beams is used. The switching is performed by vertically inserting the prism into the optical path and only less than one millimeter (limited by the beam size) movement is required. Because the switching is based on beam deflection instead of reflection, it is not vulnerable to vibration.

9 Claims, 7 Drawing Sheets

METHOD AND APPARATUS FOR LATCHED BIMORPH OPTICAL SWITCHS

FIELD OF INVENTION

The invention relates to the field of optics, and more particularly to optical switching.

BACKGROUND

The use of optical fiber for long-distance transmission of voice and/or data is common today. The continuing demand to increase the data carrying capacity raises the need to utilize the bandwidth of existing fiber-optic cable more efficiently. Wavelength Division Multiplexing (WDM) is an established method for increasing the carrying capacity of existing fiber cable where multiple information channels are independently transmitted over the same fiber using multiple wavelengths of light. Using this method, each light-wave-propagated information channel corresponds to light within a specific wavelength range or "band".

The WDM technique significantly increases the network traffic and consequently necessitates more sophisticated optical switching and routing devices that can quickly route numerous channels among various optical communication lines and that can reliably divert network traffic to alternative routes during network failures. Routine network traffic switching requires optical devices that can perform reproducibly over many thousands of switching operations. Network failure restoration requires a long unused switching device to instantaneously perform according to specification. The present invention addresses these issues.

SUMMARY OF INVENTION

The present invention provides a method and apparatus for optical switching devices utilizing a bimorph piezoelectric apparatus. The optical switching devices include an arm comprising a piezoelectric material, a first and a second surface and a first end and a second end, wherein the first surface is opposite the second surface, and the first end is opposite the second end; at least one electrode couple to the arm to provide a voltage difference between the first and second surface of the arm; a support coupled to the first end of the arm to firmly support the first end; an object with a convex surface coupled to the second end of the arm; an optical element coupled to the second surface of the arm capable of deflecting an optical signal traveling through; a first magnet proximately located to the object and to the first surface of the of the arm; and a second magnet proximately located to the object and to the second surface of the arm. The apparatus is employed by a switching system where the optical or composite optical signal travels from a collimator via optical fibers, the signal is directed by a reflective element such as a mirror, which is angled in order that the signal is in the path of the aforementioned optical element of the piezoelectric apparatus. The use of a reflective element allows the implementation of a 2×2 optical element such as a glass prism. Furthermore, the weight of the optical element allows a high switching speed, and the size of the optical element allows the beams to separate by as little as 1 mm. The optical devices are of a compact modular design that permits the construction of complex optical devices.

The present invention provides a method and apparatus for compact, high-speed, latched optical switching devices utilizing bimorph piezoelectric material. The apparatus employs an optical switching prism, that is capable of interchanging two parallel beams, o construct a 2×2 optical switch. In order to construct compact and high-speed switches, the prism has to be small and light-weigh, thus, the separation of the two parallel beams becomes small. A pair of reflection corner mirror capable of separating these two close parallel beams is used. The switching is performed by vertically inserting the prism into the optical path and only less than one millimeter (limited by the beam size) movement is required. Because the switching is based on beam deflection instead of reflection, it is not vulnerable to vibration.

The actuating element of the switch is a piece of bimorph material. One end of the bimorph is mounted on a fixture and the other can be moved up or down. The movement is driven by applying switching voltage onto the bimorph. The switching prism is attached on the moving end. Magnetic latching is applied in the switch. Two small steel balls are attached on the top and bottom surfaces at the moving end of the bimorph. Two small magnets are placed close to the two steel balls, respectively, and form a magnetic bi-stable latching mechanism.

The advantages of the proposed optical switches are compactness, high-speed, and low vulnerability to vibration.

DETAILED DESCRIPTION

The present invention provides method and apparatus for optical switching devices that vertically displaces the switching medium. The following description is presented to enable one of ordinary skill in the art to make and use the invention and is provided in the context of a patent application and its requirements. Various modifications to the embodiments will be readily apparent to those skilled in the art and the generic principles herein may be applied to other embodiments. Thus, the present invention is not intended to be limited to the embodiments shown but is to be accorded the widest scope consistent with the principles and features described herein.

Figure 1:
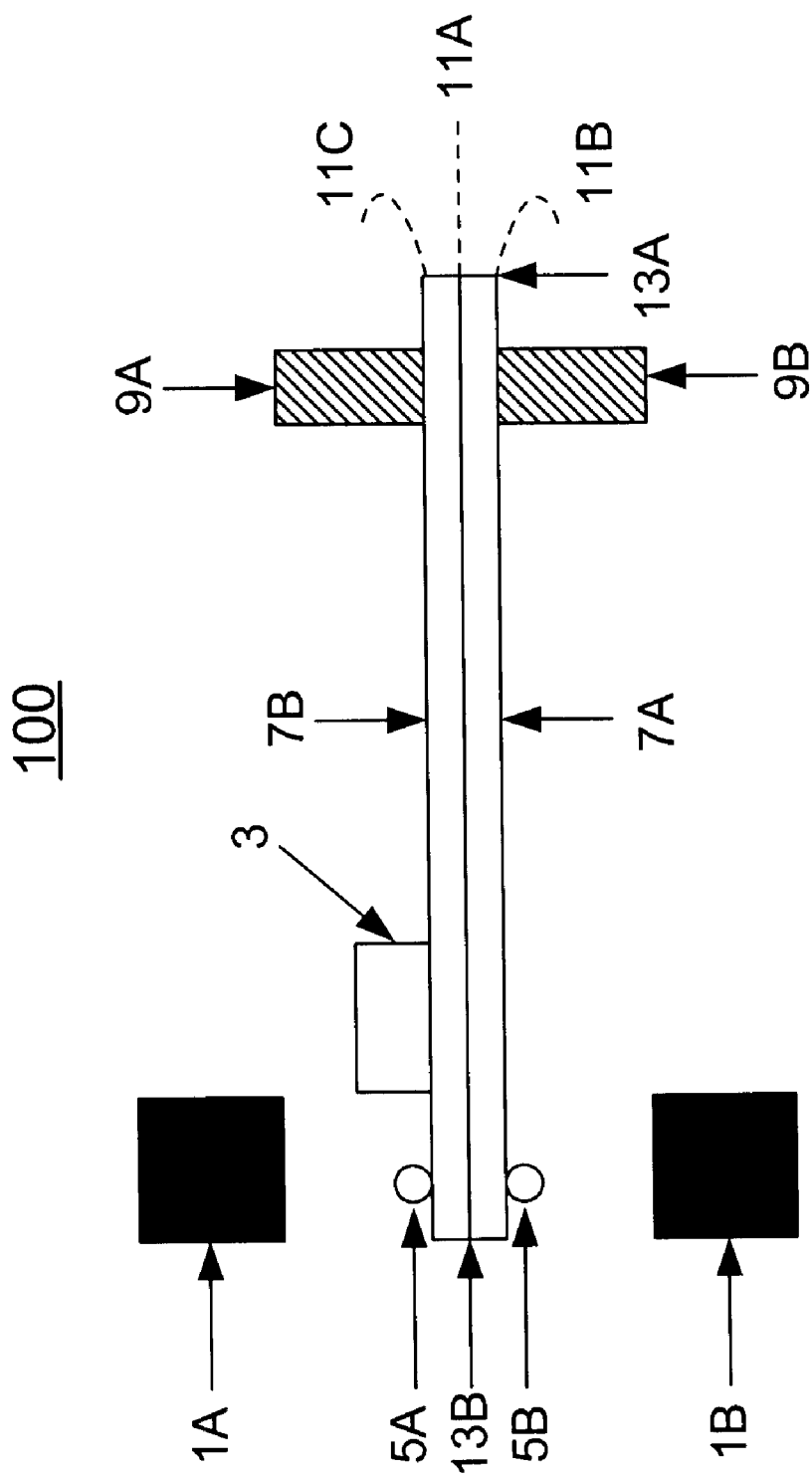
FIG. 1 is a side view of one embodiment of the piezoelectric latching apparatus in its neutral state.

FIG. 1 depicts a side view of one embodiment 100 of the present invention. The apparatus 100 comprises two elongate plates 7A and 7B consisting of a piezoelectric material such as quartz. The plates are secured together in parallel and supported by mounting elements 9A and 9B. One electrode 11A is implemented between the piezoelectric plates 7A and 7B along the shared surface between the plates. A second electrode 11B and a third electrode 11C are implemented along the non-shared surfaces of the piezoelectric plates 7A and 7B respectively. When secured together, the piezoelectric plates 7A and 7B encompass a single arm 13 which comprises a first end 13A, which is firmly supported by mounting elements 9A and 9B, and a second opposing end 13B which is not tightly mounted. Two permanent magnets 1A and 1B are placed on either side of the end 13B. In addition two solid objects 5A and 5B, possibly metallic spheres, are fixed on either surface of the end 13B. The objects 5A and 5B are composed of material such as iron, steel, or nickel that experiences a magnetic force of attraction toward either permanent magnets 1A or 1B. Furthermore, an optical element 3 (e.g. glass prism, wave plate, etc) is mounted to the arm 13 along an unshared surface of the plate 7B and near the metallic sphere 5A.

As depicted in FIG. 1, the end 13B of the piezoelectric plates 7A and 7B is shown to rest exactly between the two permanent magnets 1A and 1B in a hypothetical metastable physical state where the upward force of the attraction between the sphere 5A and the magnet 1A balances the downward force of the attraction between the sphere 5B and the magnet 1B perfectly. However, such an intermediate metastable state cannot physically exist for any finite period of time due to slight perturbations of the position of the arm 13 that results in situations where the opposing forces are unbalanced and the free end 13B of arm 13 would be pulled by the magnetic force of either magnets until one of the spheres 5A or 5B contacts its corresponding magnets 1A or 1B. Moreover, the two alternative positions create a pair of stable, "latched" positions.

Furthermore, the operation of the present embodiment demands that the electrodes 11A–C apply differential voltages across the surface of the bonded piezoelectric plates 7A and 7B, in order that the differential piezoelectric expansion and/or contraction cause vertical movements of the arm 13. The electrode 11A applies a variable voltage while the electrode 11B maintains a constant voltage and the electrode 11C is grounded in order to generate and maintain the differential voltages across the piezoelectric plates 7A and 7B. The electrode 11A varies its voltage to direct the arm 13 either upward or downward. Moreover, the end 13A of the arm 13 is firmly secured leaving 13B as the only movable portion of the arm 13. It is therefore possible to achieve precise and rapid control of the position of the end 13B, and consequently, the position of the prism 3.

Figure 2A:
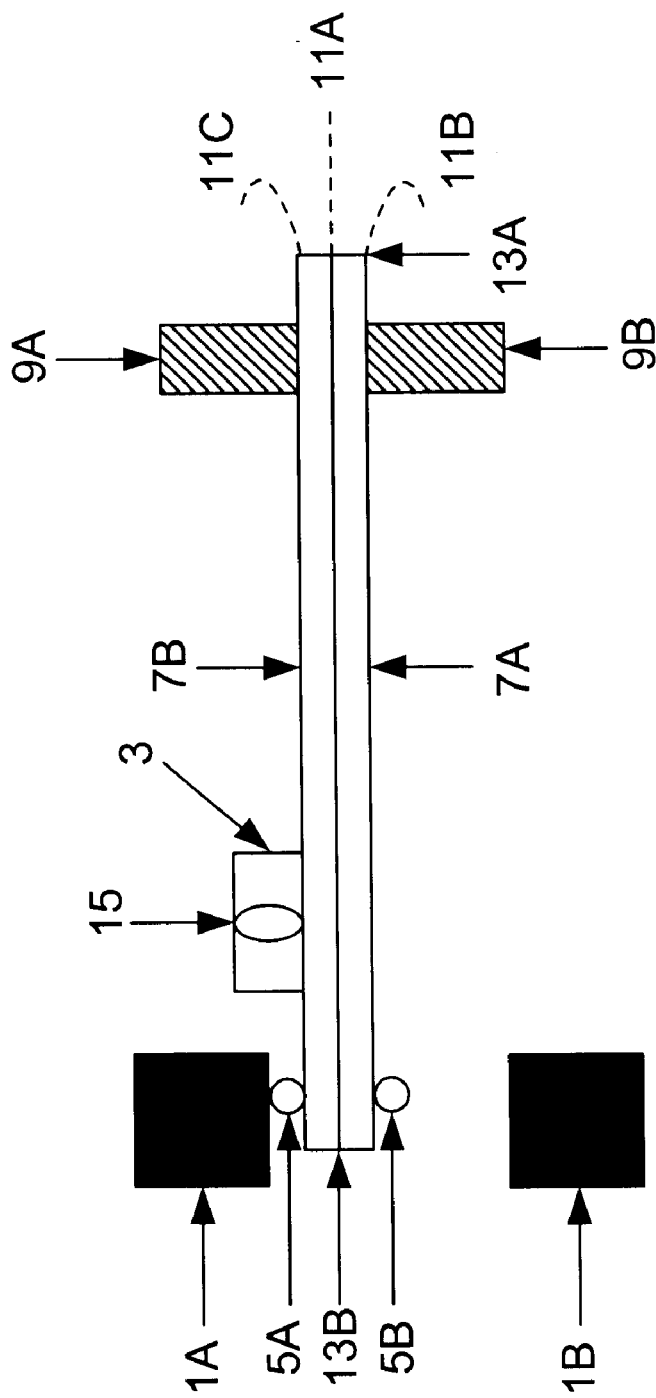
FIG. 2A is a side view of one embodiment of the piezoelectric latching apparatus in its "on" position.
Figure 2B:
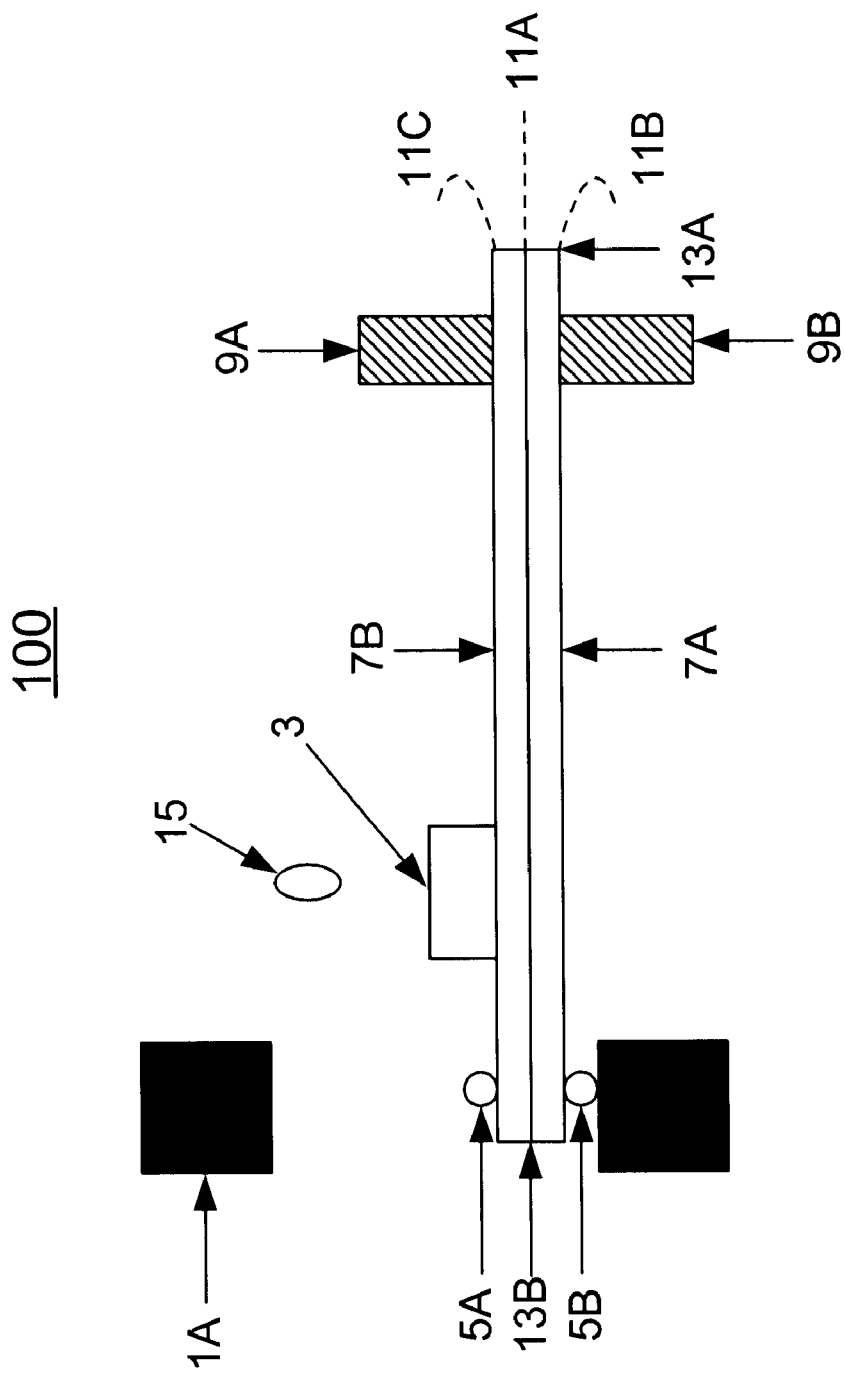
FIG. 2B is a side view of one embodiment of the piezoelectric latching apparatus in its "off" position.

FIG. 2A illustrates the piezoelectric apparatus in its latched "on" state, where the optical element 3 intercepts the optical signal 15. In contrast, FIG. 2B depicts the piezoelectric apparatus in its latched "off" state, where the optical signal 15 is not intercepted by the optical element 3. Further, because the "off" state of the apparatus 100 requires that the optical element 3 to be non-planar to the optical signal, the piezoelectric apparatus may move the optical element 3 less than 1 mm vertically away from the plane in order to avoid intercepting the optical signal.

Figure 3:
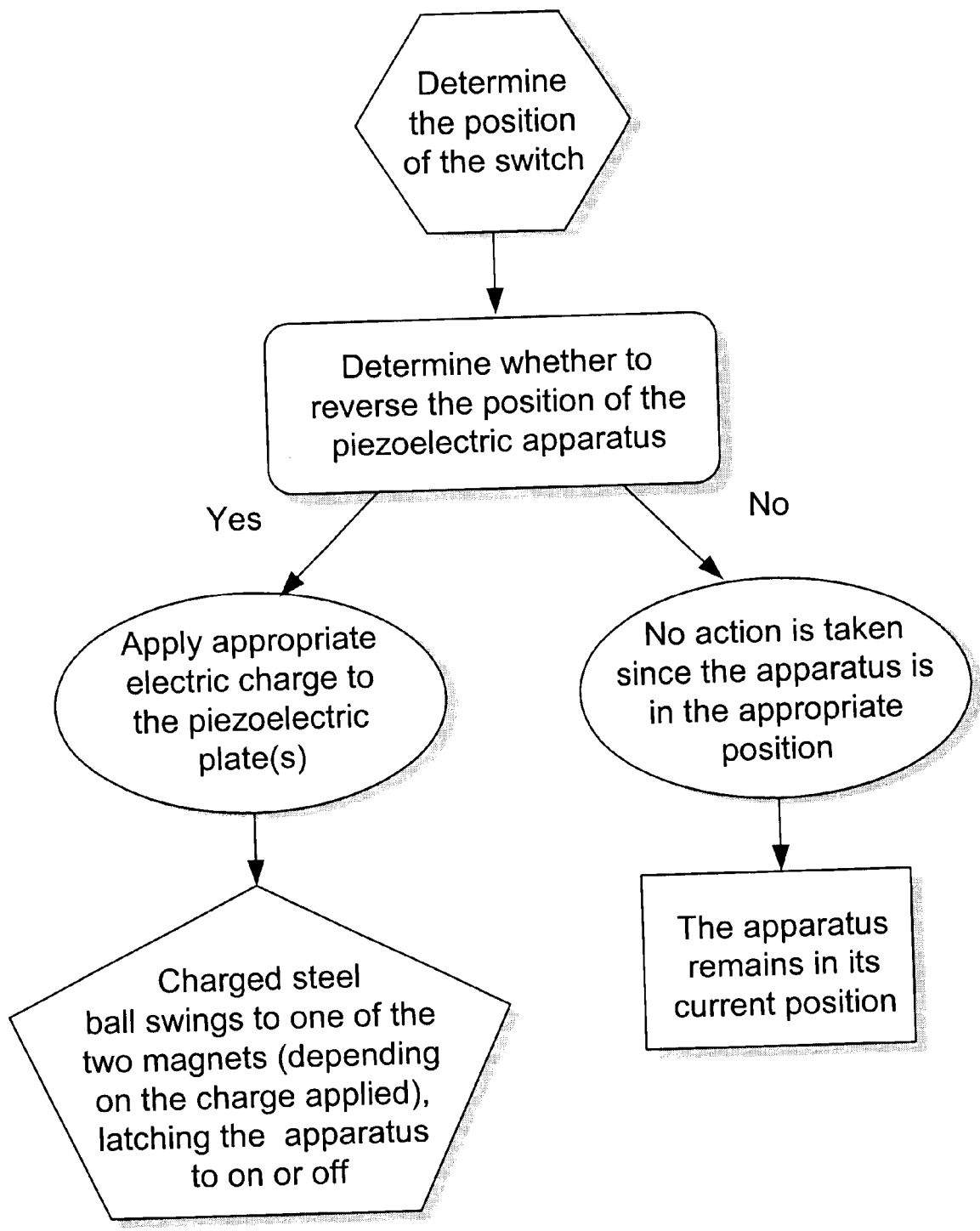
FIG. 3 is a flow chart of the logical process for the positioning of the piezoelectric apparatus.

The flow chart FIG. 3 illustrates the actions taken in cases where the position of the piezoelectric arm 13 is to be reversed. In one embodiment where the desired latching position is "off" and the apparatus 100 is latched "on", an electric charge is applied to the electrode 11A in order to reverse the latching position. Conversely, in another embodiment where the desired latching position is "on" and the apparatus 100 is latched "off", an electric charge similar in magnitude and opposite in polarity is applied to the electrode 11A in order to latched the apparatus "on".

Figure 4A:
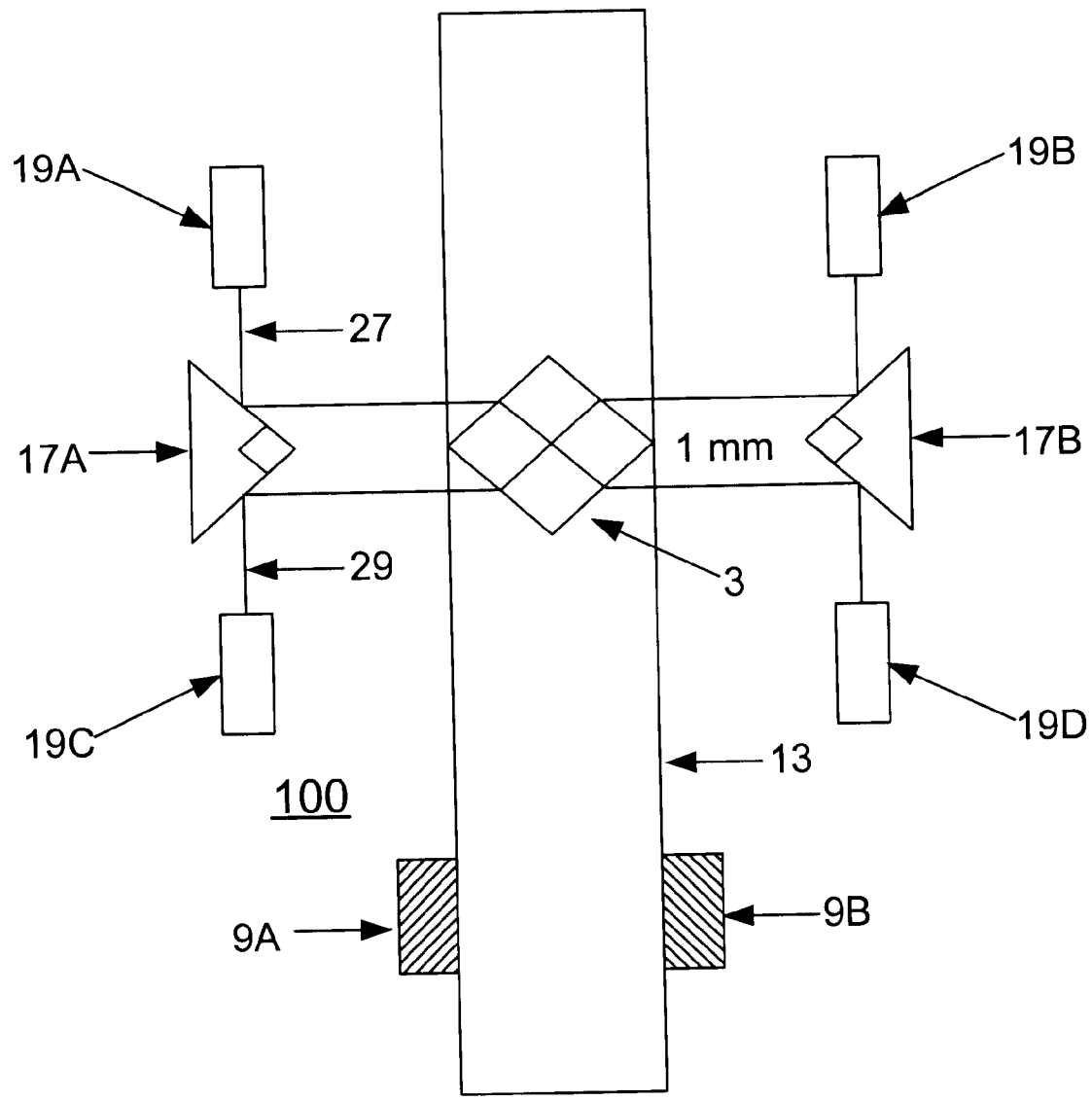
FIG. 4A is top view of one embodiment of the optical switch where the piezoelectric latching apparatus is in its "on" position.
Figure 4B:
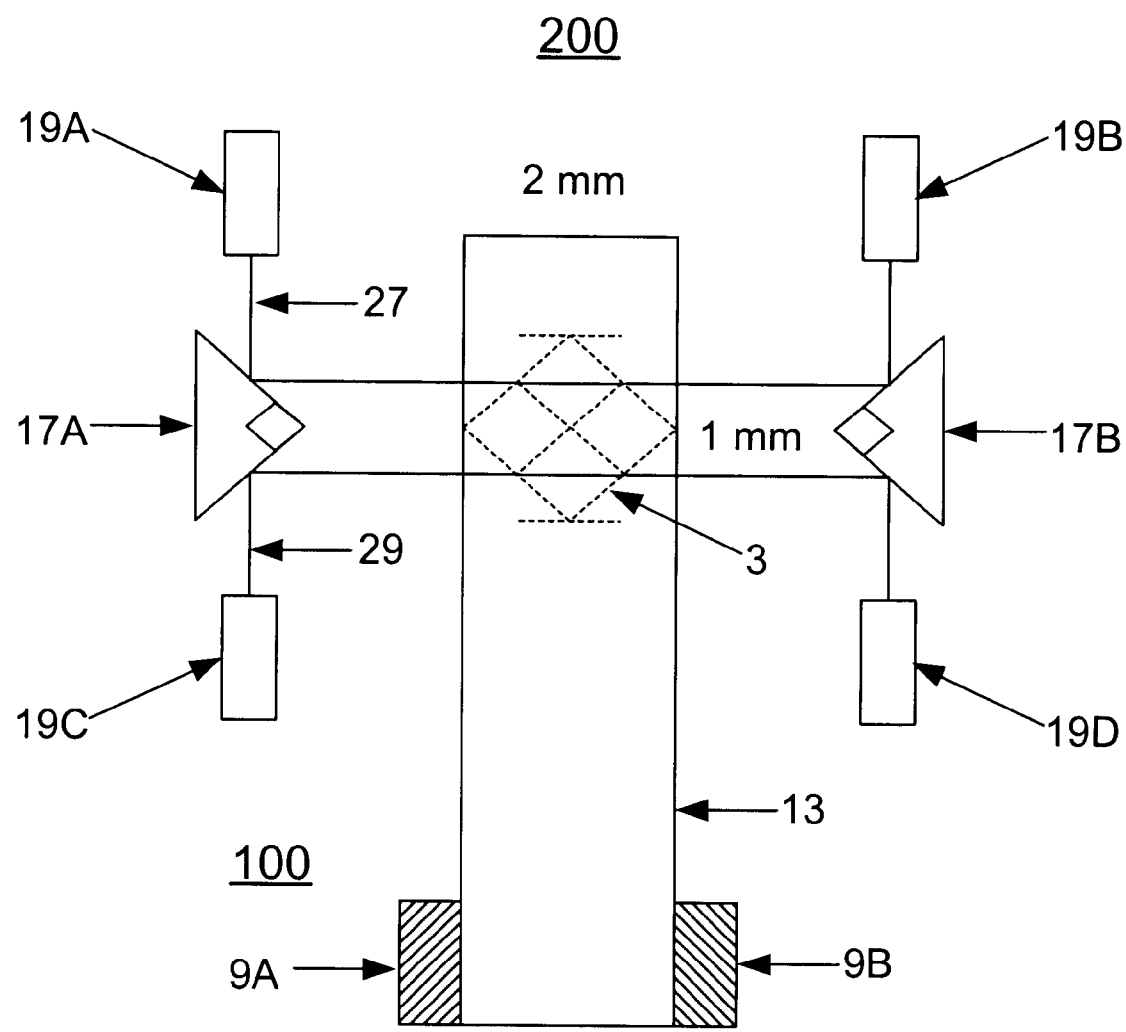
FIG. 4B is a top view of one embodiment of the optical switch where the piezoelectric latching apparatus is in its "off" position.

FIGS. 4A and 4B are top views of an optical switch 200 which embodies the deflection and latching apparatus 100 in both the "on" and "off" state. In both figures, an optical signal or composite optical signals 27 and 29 are transmitted via optical fibers from collimators 19A and 19C respectively. The signals are then reflected by the a reflective element 17A such as a mirror in order that the resulting light beam crosses the "on" position of the 2×2 prism 3 latched by the piezoelectric latching apparatus 100. FIG. 4A depicts the "on" switch position where the piezoelectric latching apparatus is latched vertically downward and planar to the reflective elements 17A and 17B. While the apparatus 100 maintains the "on" position, the 2×2 prism 3 intercepts the signal pathways and deflects the signals to focus onto the reflective element 17C, which in turn directs the signals 27 and 29 to a crisscross path into the collimators 19D and 19B respectively. Conversely, FIG. 4B illustrates the "off" switch position where the piezoelectric latching apparatus is latched vertically upward away from the reflective elements 17A and 17B. While the apparatus is in its "off" position, the 2×2 prism 3 does not intercept or deflect the signal pathway and the switch is effectively turned off. As shown in FIG. 3A where the switch 200 is latched in the "on" position, the optical signal 21 is deflected from the straight line path. In FIG. 3B, where the switch 200 is latched in the "off" position, the optical signals are not intercepted by the 2×2 prism 3 and thus travel straight to focus onto the reflective element 17B, which in turn transmits the signals 27 and 29 to the collimators 19B and 19D respectively. Moreover, because the collimators are not placed directly on the sides of the optical element 3, the space between the beams 27 and 29 could be as small as 1 mm.

Figure 5:
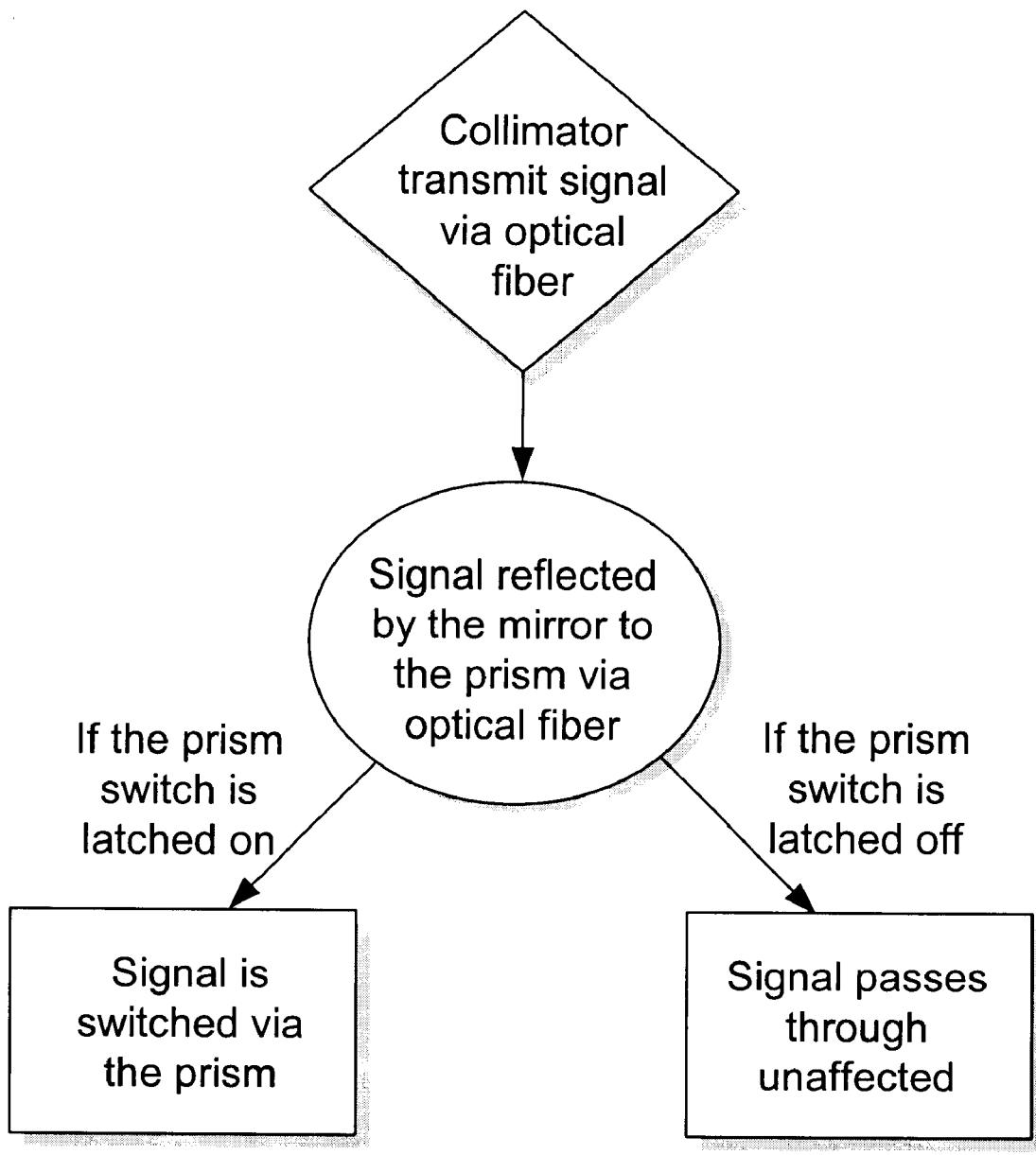
FIG. 5 is a flow chart of the 2×2 prism switch and signal deflection.

The flow chart FIG. 5 summarizes different paths the optical signal takes where the piezoelectric apparatus is latched "on" or "off". The optical signal is transmitted via a collimator, and then reflected by a mirror in order to cross the path of the prism 3. In one embodiment where the piezoelectric apparatus 100 is latched vertically downward and planar to the reflective elements 17A and 17B, the prism deflects the signal to redirect its path. Conversely, in the absence of the prism where the piezoelectric apparatus 100 is latched "off" and vertically upward and non-planar to the reflective 17A and 17B, the prism does not intercept the signal, which travels straight without deflection.

In another embodiment of the present invention, the optical element 3 is a half-wave plate. The piezoelectric apparatus 100 is latched similarly as in the embodiment where the optical element is a prism, however, the half-wave plate controls beam polarization rather than switching.

The present invention has been described with an optical switching device utilizing a bimorph piezoelectric material although one of ordinary skill in the art realizes that other suitable materials may be substituted without altering the essence of the invention.

A method and apparatus for optical switching devices utilizing a bimorph piezoelectric electro-mechanical deflection and latching apparatus is herein disclosed. The optical device includes a 2×2 optical prism switch or a half-wave plate utilizing a piezoelectric apparatus. The optical devices in accordance with the present invention are of a compact modular design that allows the construction of more complex optical devices. The optical devices in accordance with the present invention possess the advantages of stable and reproducible operation, high switching speeds relative to other mechanical devices and low sensitivity to slight optical mis-alignments or vibrations.

I claim:

1. An optical switching system, comprising:
   a first reflective element and a second reflective element, where the first reflecting element is opposite the second reflecting element;

at least two collimators where the first collimator is proximately located to the first reflective element and the second collimator is proximately located to the second reflective element;

an optical apparatus switch for receiving an optical signal from one of the optical collimators and deflecting the optical signal to another collimators, wherein the optical apparatus comprises:

an arm comprising a piezoelectric material, the arm comprising a first and a second surface and a first and a second end, wherein the first surface is opposite to the second surface, wherein the first end if opposite to the second end;

an optical element mounted along the first surface of the arm;

a mounting element coupled to the first end of the arm for secure support of the end;

at least one object with a convex surface coupled to the second end of the arm;

a first magnet located opposite the first surface, in proximity to the second end of the arm;

a second magnet located opposite the second surface, in proximity to the second end of the arm; and at least one electrode coupled to the arm to provide a voltage difference between the first and the second surface of the arm.

2. The switch of claim 1, wherein the collimators comprises:

at least one collimator proximately located near the first reflective element and directly in the path of one reflective surface; and at least one collimator proximately located near the second reflective element and directly in the path of one reflective surface.

3. The switch of claim 1, wherein the reflective element comprises a mirror.

4. The apparatus of claim 1, wherein the arm comprises:

a first piezoelectric plate; and a second piezoelectric plate couple to the first in parallel.

5. The apparatus of claim 1, wherein the optical element comprises a 2×2 prism.

6. The apparatus of claim 1, wherein the optical element comprises a half-wave plate.

7. The apparatus of claim 1, wherein the support comprises;

a first support member coupled to the first end and the first surface of the arm; and a second support member coupled to the first end and the second surface of the arm.

8. The apparatus of claim 1, wherein the object comprises:

a first metallic object coupled to the second end and the first surface of the arm; and a second metallic object coupled to the second end and the second surface of the arm.

9. The apparatus of claim 1, wherein at least one electrode comprises:

a first electrode coupled to the first piezoelectric plate along its non-shared surface;

a second electrode coupled to the second piezoelectric plate along its non-shared surface; and a third electrode implemented along the shared surface between the first and the second piezoelectric plates.

* * * * *